United States Patent
Wang et al.

(10) Patent No.: US 9,327,709 B2
(45) Date of Patent: May 3, 2016

(54) CANCELLING CREEP TORQUE IN A HYBRID VEHICLE

(71) Applicant: FORD GLOBAL TECHNOLOGIES, LLC, Dearborn, MI (US)

(72) Inventors: Xiaoyong Wang, Novi, MI (US); Wei Liang, Farmington Hills, MI (US); Rajit Johri, Ann Arbor, MI (US); Mark Steven Yamazaki, Canton, MI (US); Ming Lang Kuang, Canton, MI (US); Ryan Abraham McGee, Ann Arbor, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 96 days.

(21) Appl. No.: 14/178,695

(22) Filed: Feb. 12, 2014

(65) Prior Publication Data
US 2015/0224976 A1 Aug. 13, 2015

(51) Int. Cl.
*B60W 10/08* (2006.01)
*B60W 10/18* (2012.01)
*B60K 6/48* (2007.10)
*B60W 30/18* (2012.01)

(52) U.S. Cl.
CPC .............. *B60W 10/08* (2013.01); *B60K 6/48* (2013.01); *B60W 10/18* (2013.01); *B60W 30/18063* (2013.01); B60K 2006/4825 (2013.01); B60W 2520/10 (2013.01); B60W 2530/10 (2013.01); B60W 2540/12 (2013.01); B60W 2550/142 (2013.01); B60W 2710/083 (2013.01); Y02T 10/6286 (2013.01); Y10S 903/902 (2013.01); Y10T 477/24 (2015.01)

(58) Field of Classification Search
CPC ........... B60L 15/2045; B60L 15/2063; B60W 20/00; B60W 2520/10; B60W 2540/12; B60W 2710/083; B60W 30/18063; Y02T 10/7283; Y10T 477/37; Y10T 477/38
See application file for complete search history.

(56) References Cited

U.S. PATENT DOCUMENTS

| | | | |
|---|---|---|---|
| 5,905,349 A | 5/1999 | Farkas et al. | |
| 6,278,916 B1 | 8/2001 | Crombez | |
| 8,315,752 B2 | 11/2012 | Kwon et al. | |
| 2005/0211478 A1* | 9/2005 | Sakuma | B60L 7/003 180/65.1 |
| 2008/0032856 A1* | 2/2008 | Gohring | B60K 6/48 477/5 |
| 2008/0156550 A1* | 7/2008 | Wei | B60K 6/387 180/65.23 |
| 2009/0114468 A1 | 5/2009 | Schwarz et al. | |
| 2009/0198427 A1* | 8/2009 | Jackson | B60T 7/122 701/70 |
| 2009/0234528 A1* | 9/2009 | Crombez | G07C 5/0825 701/31.4 |
| 2010/0076637 A1* | 3/2010 | Ueoka | B60T 7/042 701/22 |
| 2011/0065548 A1* | 3/2011 | Yu | B60W 10/06 477/203 |
| 2011/0136625 A1* | 6/2011 | Yu | B60W 10/06 477/185 |
| 2012/0071296 A1* | 3/2012 | Miyamoto | B60W 10/08 477/27 |
| 2013/0090800 A1 | 4/2013 | Nakamura et al. | |
| 2013/0109524 A1* | 5/2013 | Kaltenbach | B60K 6/387 475/5 |
| 2013/0124021 A1* | 5/2013 | Chung | B60W 30/18063 701/22 |

(Continued)

*Primary Examiner* — Thomas G Black
*Assistant Examiner* — Ce Li
(74) *Attorney, Agent, or Firm* — David B. Kelley; Brooks Kushman P.C.

(57) ABSTRACT

A hybrid vehicle includes an engine and an electric machine, both capable of propelling the vehicle. The electric machine provides creep torque to propel the vehicle at a slow speed or hold the vehicle when on an incline. At least one controller is programmed to cancel or otherwise inhibit the electric machine from generating the creep torque in response to a brake torque or brake torque request exceeding a calibratible threshold. The calibratible threshold varies based upon vehicle incline, vehicle mass, and/or vehicle speed.

16 Claims, 4 Drawing Sheets

(56) References Cited

U.S. PATENT DOCUMENTS

| | | | | |
|---|---|---|---|---|
| 2013/0288855 A1* | 10/2013 | Monsere | B60L 15/2045 | 477/24 |
| 2013/0291830 A1* | 11/2013 | Doering | F02D 41/023 | 123/350 |
| 2013/0296111 A1* | 11/2013 | Nedorezov | B60W 20/00 | 477/5 |
| 2014/0067154 A1* | 3/2014 | Yu | B60W 40/076 | 701/1 |
| 2014/0067155 A1* | 3/2014 | Yu | B60W 40/13 | 701/1 |
| 2014/0207324 A1* | 7/2014 | Murakami | B60K 6/48 | 701/22 |

* cited by examiner

US 9,327,709 B2

CANCELLING CREEP TORQUE IN A HYBRID VEHICLE

TECHNICAL FIELD

The present disclosure relates to cancelling or otherwise preventing the application of creep torque in a hybrid vehicle.

BACKGROUND

Conventional vehicles include an internal combustion engine that acts as the sole source of propulsion power in the vehicle. When an operator of a conventional vehicle releases the brake pedal when the vehicle is at a complete stop, a small amount of torque is realized at the wheels due to the torque from the engine operating at idle speed. This is commonly referred to as "creep torque."

Hybrid electric vehicles (HEVs) include an electric machine (e.g., motor/generator) operatively coupled to the powertrain that can supplement or replace the torque from the engine to propel the vehicle. The electric machine can also provide a positive amount of torque to the wheels to simulate creep torque from the engine. The electric machine can be utilized and controlled to conserve fuel. Particular control of the electric machine should be given at times in which the vehicle is prone to creeping, as these are prime opportunities to conserve a relatively large amount of energy.

SUMMARY

According to one embodiment, a vehicle comprises an electric machine and at least one controller. The electric machine is configured to generate creep torque to move the vehicle. The at least one controller is programmed to prevent the electric machine from generating the creep torque in response to brake torque exceeding a calibratible threshold, indicating a desire to stop or hold the vehicle.

The brake torque may include an amount of torque provided by a hydraulic brake system and/or regenerative braking. The brake torque exceeding the calibratible threshold may also be defined as a brake torque request exceeding a threshold.

A method of preventing creep torque in a hybrid vehicle is also provided. The method includes applying creep torque to vehicle wheels generated by an electric machine. Brake torque is applied to the wheels subsequent to the applying of creep torque. The method also includes preventing the electric machine from generating the creep torque in response to the brake torque exceeding a calibratible threshold indicating a desire to stop or hold the vehicle.

A system is also provided for cancelling creep torque application in a hybrid vehicle. An electric machine is configured to generate creep torque to move the vehicle. At least one controller is programmed to cancel the creep torque in response to brake torque exceeding a calibratible threshold that is based upon vehicle incline, vehicle mass or vehicle speed.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
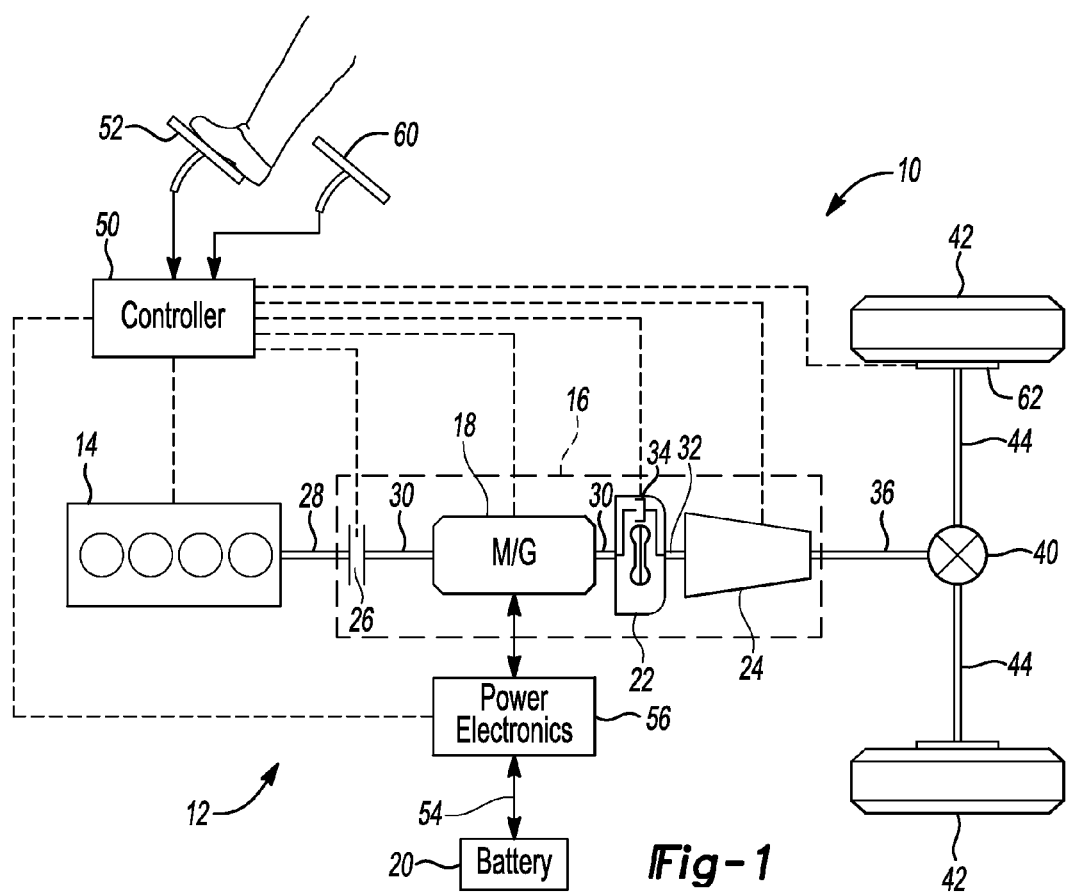
FIG. 1 is a schematic of a hybrid electric vehicle according to one embodiment.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller 50, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU). While illustrated as one controller, the PCU may be part of a larger control system and may be controlled by various other controllers throughout the vehicle 10, such as a vehicle system controller (VSC). The VSC can also communicate with a braking control module (BCM) to actuate and control the braking system of the vehicle. It should therefore be understood that the powertrain control unit and one or more other controllers can collectively be referred to as a "controller" 50 that controls various actuators in response to signals from various sensors to control functions such as starting/stopping engine 14, operating M/G 18 to provide wheel torque or charge battery 20, select or schedule transmission shifts, apply braking, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as a PCU. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

A brake pedal 60 is also provided. Pedal depression of the brake pedal can be translated by the controller 50 into a brake torque request. Hydraulic brakes 62 can be actuated via hydraulic pressure in a conventional hydraulic brake system. Additionally, depression of the brake pedal 60 can actuate regenerative braking in the M/G 18. The hydraulic braking and regenerative braking are coordinated for efficiency by the controller 50 in an overall brake system to fulfill the brake torque request.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

In conventional (non-hybrid) vehicles, the engine provides a small amount of torque ("creep torque") when the vehicle is stopped or moving at slow speeds. Creep torque can typically occur when an operator releases the brake pedal from a complete stop while the vehicle is in drive, for example. Creep torque can also be utilized to hold the vehicle when the vehicle is on an incline.

In a hybrid vehicle, such as the hybrid vehicle of FIG. 1, the M/G 18 can also provide creep torque to slightly propel or hold the vehicle motionless on an incline. To do so, the controller 50 can determine whether the vehicle is in a creep mode. This determination may be based on, for example, the vehicle being in a driving gear, moving at a slow speed or being motionless, and the driver applying little to no force on the accelerator pedal. Of course, other factors or combinations of factors may be employed for the controller to determine that the vehicle is in a creep mode.

When the hybrid vehicle is in the creep mode, the M/G 18 can operate in a torque control mode or a speed control mode to deliver creep torque to the wheels of the vehicle. When operating in the torque control mode, the controller 50 commands a torque output of the M/G 18 irrespective of the speed of the M/G 18. The torque control mode may be beneficial when, for example, the bypass clutch 34 is engaged such that the torque converter does not dampen or otherwise affect the torque output of the M/G 18.

The M/G 18 can also operate in the speed control mode. When operating in the speed control mode, the controller 50 commands a speed output of the M/G 18 irrespective of the torque of the M/G 18. This operating mode may be beneficial when, for example, the bypass clutch 34 is disengaged. The speed control provides desirable creep characteristics from the M/G; the creep torque can automatically adapt and vary in response to vehicle speed. For example, when the vehicle speed is higher, the creep torque can be reduced, and vice versa.

In order to conserve energy, the creep torque provided by the M/G 18 should be cancelled or otherwise prevented when unnecessary. The determination the creep torque should be based on the driver's intention to stop or hold the vehicle motionless. For example, the vehicle should understand whether the driver intends to maintain creep torque at the wheels or, alternatively, whether the driver is indicating a desire to stop or hold the vehicle motionless. According to embodiments of the present disclosure, the creep torque is cancelled based on the driver indicating a desire to stop the vehicle or hold the vehicle motionless while the vehicle is on an incline, for example.

Figure 2:
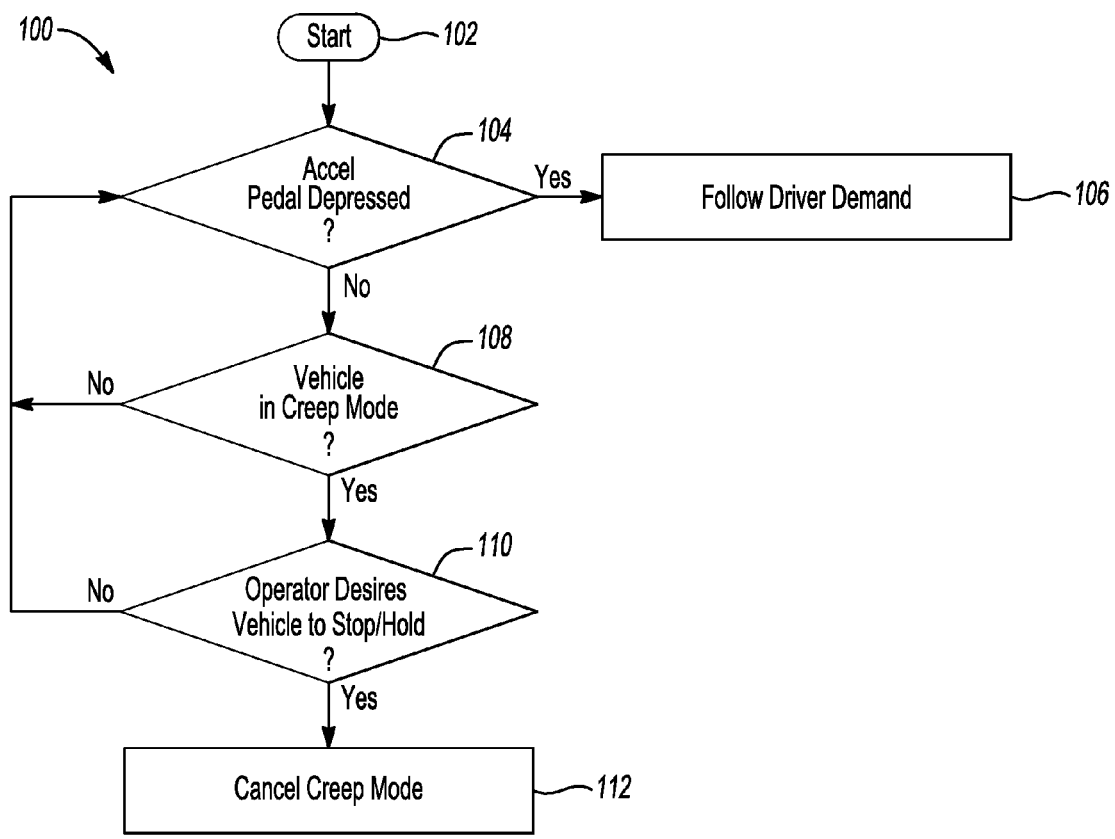
FIG. 2 is a flowchart illustrating a computer-implemented algorithm to cancel or prevent creeping in the vehicle.

Referring to FIG. 2, a flow chart illustrates an algorithm 100 implemented by the controller to cancel or prevent the creep mode and thus inhibit creeping torque from being transmitted to the wheels. The algorithm begins at 102. The controller determines whether the accelerator pedal is depressed at 104. If the accelerator pedal is depressed, this indicates that the operator of the vehicle intends to propel the vehicle and thus more than mere creep torque may be applied to the wheels. Instead of determining whether the accelerator pedal is depressed at all, the controller can determine whether the accelerator pedal is depressed beyond a depression threshold. In either situation, the driver acceleration demands are followed and fulfilled at 106.

The controller next determines whether the vehicle is in a creep mode at 108. As explained above, this determination may be based on, for example, the vehicle being in a driving gear, moving at a slow speed or being motionless, and the driver applying little to no force on the accelerator pedal.

At 110, the controller determines whether the operator has indicated a desire to stop the vehicle or hold the vehicle motionless. As will be explained, this indication can be inferred based on a brake torque provided by the operator. The amount of brake torque necessary to stop or hold the vehicle motionless can change based on, for example, the speed of the vehicle, the mass of the vehicle, and/or the incline or grade the vehicle is on. Each of these conditions can vary in magnitude during various vehicle operating conditions. The amount of brake torque necessary to stop or hold the vehicle may change as the vehicle operating conditions change. As such, the amount of desired brake torque (as indicated by brake pedal depression, for example) under one situation may indicate a desire to stop or hold the vehicle while the same amount of desired brake torque under a different situation may not indicate a desire to do so. For example, slight depression of the brake pedal on flat ground while the vehicle is moving may indicate a desire to stop the vehicle; however, the same amount of brake pedal depression while the vehicle is on a sharp decline with a heavy load may only indicate the operator's desire to keep the vehicle at a constant slow speed. In another example, the amount of brake torque necessary to stop the vehicle may be different when the vehicle is traveling at 1 mph as opposed to 4 mph. These exemplary characteristics (speed, mass, and incline) of the vehicle can be utilized by the controller to effectively determine whether an amount of brake torque requested by the operator is actually indicative of the operator's desire to stop or hold the vehicle. If the operator does in fact indicate a desire to stop or hold the vehicle, the creep mode is cancelled at 112. To cancel the creep mode, the controller prevents or inhibits the M/G from transmitting torque to the wheels.

Figure 3:
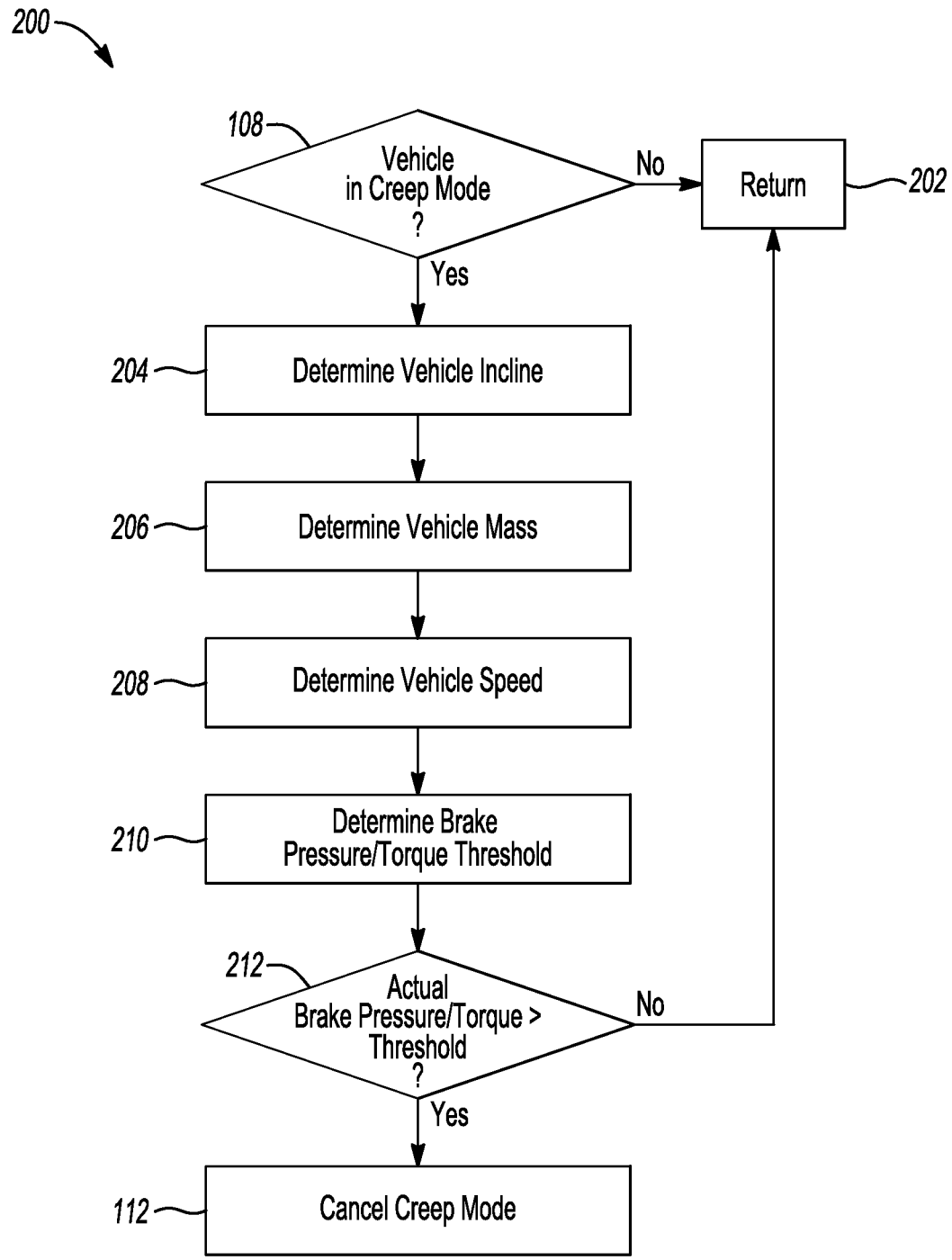
FIG. 3 is another flowchart illustrating a computer-implemented algorithm to cancel or prevent creeping in the vehicle.

FIG. 3 is a flowchart illustrating an algorithm 200 with additional detail for determining whether or not to cancel the creep mode based on the intent of the operator between steps 108 and 112 of FIG. 2. The algorithm begins at 108 in which the controller determines whether the vehicle is operating in a creep mode as provided by the methods described above. If the vehicle is not, the algorithm returns at 202 to, for example, step 104 of FIG. 2.

If it is determined that the vehicle is operating in a creep mode, the controller begins to check various operating conditions of the vehicle. For example, the incline of the vehicle is determined at 204, the mass of the vehicle (including its contents) is determined at 206, and the speed of the vehicle is determined at 208. These determinations can be accomplished according to known techniques. These three vehicle operating conditions are mere exemplary, and other operating conditions can be utilized to better determine whether the operator is in fact applying sufficient brake pressure to indicate a desire to stop or hold the vehicle.

At 210, a brake pressure or brake torque threshold is determined based on the determined vehicle operating conditions (204, 206, 208). The threshold varies and is calibrated at any given time such that if a brake torque request from the operator exceeds this threshold, an inference is made that the operator intends to stop or hold the vehicle motionless. For example, compared to when the vehicle is relatively light and on a flat surface, the threshold may be high when the vehicle is relatively heavy and traveling slightly downhill. Under such circumstances, the threshold can increase to reflect the increased amount of brake torque necessary to stop or hold the vehicle. Due to the increased threshold, the creep torque may remain active while the brake pedal is depressed to a certain position that, under other circumstances, might otherwise cause the controller to deactivate the creep torque.

The threshold is compared to a measured brake torque request (as a function of brake pedal depression, for example) at 212. If the brake torque request indeed exceeds the threshold at 212, the creep torque provided by the engine and/or M/G is cancelled or otherwise prevented from being realized at the wheels. Cancelling the creep mode saves energy generation and distribution during times in which the energy is not necessary due to the operator's inferred intention to stop or hold the vehicle.

Figure 4A:
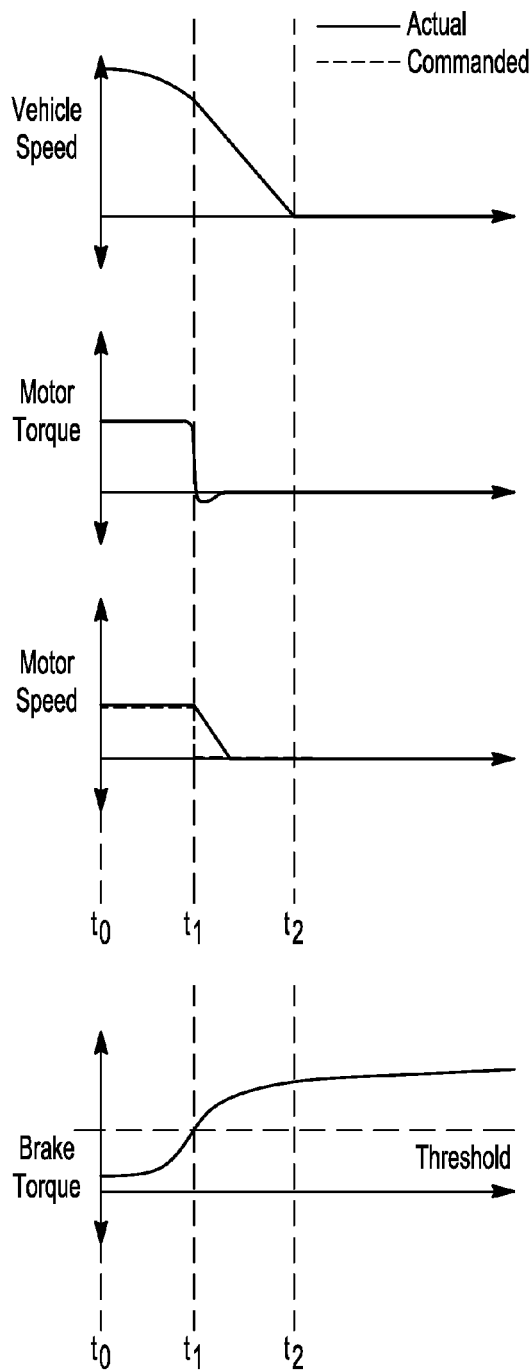
FIG. 4A is a graphical illustration of creep torque being cancelled in an electric machine while the electric machine is operating in a speed control mode.
Figure 4B:
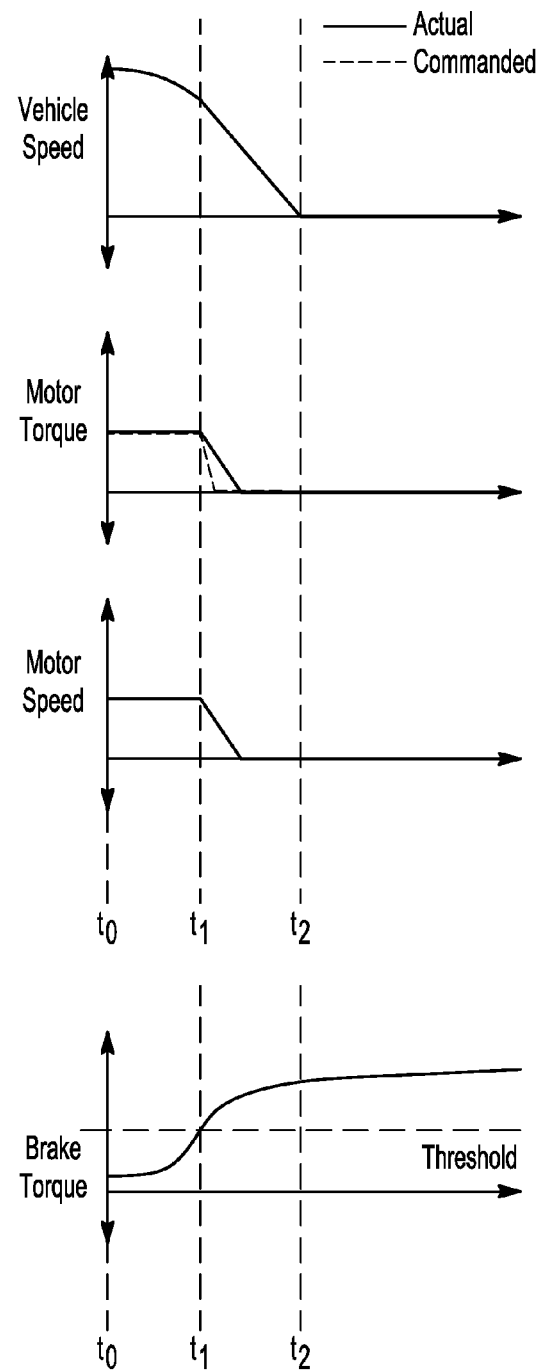
FIG. 4B is a graphical illustration of creep torque being cancelled in the electric machine while the electric machine is operating in a torque control mode.

FIGS. 4A and 4B illustrate the operation of the M/G when the creep torque is cancelled. In FIG. 4A, the creep torque is cancelled when the M/G was providing creep torque in the speed control mode. In FIG. 4B, the creep torque is cancelled when the M/G was providing creep torque in the torque control mode.

FIG. 4A illustrates the M/G (motor) torque and motor speed in relation to vehicle speed when the vehicle is decelerating. Prior to $t_1$, the motor is providing a positive torque to providing creep torque to the wheels. During this time, the total amount of brake torque applied (as commanded by the operator) can be greater than zero. In other words, a small amount of brake torque (i.e., less than the threshold) can be applied to reduce the speed of the vehicle. At $t_1$, the brake torque request from the operator exceeds the threshold, providing an indication of an intent to stop the vehicle. Creep torque is therefore cancelled at $t_1$. Because the motor is operated in the speed control mode, the commanded speed of the motor controllably reduces to zero between $t_1$ and $t_2$, which brings the actual motor speed to zero shortly thereafter. At the same time, the motor torque changes from positive to negative, indicating regenerative braking in the motor. The regenerative braking can be used in combination or without friction braking to meet the requested brake torque, as described above. The vehicle comes to a rest at $t_2$ with no applied torque from the motor.

FIG. 4B is similar to FIG. 4A except the motor is illustrated operating in a torque control mode rather than a speed control mode. In the torque control mode, the motor torque is controllably reduced to zero irrespective of motor speed. As illustrated, at $t_1$ the creep mode is cancelled. The motor torque controllably reduces to zero between $t_1$ and $t_2$ to remove any torque transferred from the motor into the transmission gearing.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an electric machine configured to generate creep torque to move the vehicle;
   a torque converter operatively coupled to the electric machine via a bypass clutch; and
   at least one controller programmed to prevent the electric machine from generating the creep torque in response to brake torque exceeding a calibratible threshold indicating a desire to stop or hold the vehicle, vary the threshold based on a detected incline of the vehicle, and reduce a speed of the electric machine to zero in response to the brake torque exceeding the calibratible threshold and the bypass clutch being at least partially disengaged.

2. The vehicle of claim 1, wherein the at least one controller is further programmed to prevent the electric machine from generating the creep torque in response to a hydraulic brake torque exceeding the calibratible threshold.

3. The vehicle of claim 2, wherein the electric machine is further configured to provide regenerative brake torque and wherein the at least one controller is further programmed to prevent the electric machine from generating the creep torque in response to a sum of the hydraulic brake torque and regenerative brake torque exceeding the calibratible threshold.

4. The vehicle of claim 1, wherein the at least one controller is further programmed to vary the calibratible threshold based upon vehicle mass or vehicle speed.

5. The vehicle of claim 1, wherein the at least one controller is further configured to reduce a torque of the electric machine to zero in response to the brake torque exceeding the calibratible threshold and the bypass clutch is engaged.

6. The vehicle of claim 1, wherein the at least one controller is further programmed to
   control the speed of the electric machine based on an amount of accelerator pedal depression in a speed control mode,
   control a torque output of the electric machine to a commanded torque value irrespective of the amount of accelerator pedal depression in a torque control mode,
   controllably reduce the speed of the electric machine to zero to prevent the electric machine from generating the creep torque when operating in the speed control mode, and
   controllably reduce the torque output of the electric machine to zero to prevent the electric machine from generating the creep torque when operating in the torque control mode.

7. A method of preventing creep torque in a hybrid vehicle comprising:
   applying creep torque to vehicle wheels generated by an electric machine;
   subsequently applying brake torque to the wheels;
   preventing the electric machine from generating the creep torque in response to the brake torque exceeding a calibratible threshold indicating a desire to stop or hold the vehicle;
   varying the threshold based on a detected vehicle incline; and
   reducing, at a controlled rate, a torque of the electric machine to zero in response to the brake torque exceeding the calibratible threshold and a torque converter bypass clutch being at least partially engaged.

8. The method of claim 7, wherein the brake torque is hydraulic brake torque.

9. The method of claim 7, wherein the brake torque includes regenerative brake torque and hydraulic brake torque.

10. The method of claim 7, further comprising altering the calibratible threshold based upon vehicle mass or vehicle speed such that the step of preventing occurs independent of a fixed brake pedal position.

11. The method of claim 7, further comprising reducing, at a controlled rate, a speed of the electric machine to zero in response to the brake torque exceeding the calibratible threshold and the torque converter bypass clutch being disengaged.

12. A system for controlling a hybrid vehicle, the system comprising:
   an electric machine configured to generate creep torque to move the vehicle;
   a torque converter bypass clutch; and
   at least one controller programmed to cancel the creep torque in response to brake torque exceeding a threshold that is based upon a detected vehicle incline, and controllably reduce a speed of the electric machine to zero when the bypass clutch is at least partially disengaged.

13. The system of claim 12, wherein the at least one controller is further programmed to cancel the creep torque in response to hydraulic pressure of hydraulic brakes exceeding a pressure threshold.

14. The system of claim 12, further comprising a torque converter operatively coupled to the electric machine, an engine, and a disconnect clutch configured to selectively couple the electric machine and engine, wherein the engine, electric machine and torque converter are arranged on a common drive axis.

15. The system of claim 12, wherein the at least one controller is further programmed to controllably reduce torque output of the electric machine to zero irrespective of a speed of the electric machine when the bypass clutch is engaged.

16. The system of claim 12, wherein the at least one controller is further programmed to cancel the creep torque while the vehicle speed exceeds 0 mph.

* * * * *